(12) United States Patent
Riedel et al.

(10) Patent No.: US 8,983,947 B2
(45) Date of Patent: Mar. 17, 2015

(54) AUGMENTING SEARCH WITH ASSOCIATION INFORMATION

(75) Inventors: Lance Riedel, Menlo Park, CA (US); Georgios Mavromatis, San Francisco, CA (US)

(73) Assignee: Jive Software, Inc., Portland, OR (US)

( * ) Notice: Subject to any disclaimer, the term of this patent is extended or adjusted under 35 U.S.C. 154(b) by 328 days.

(21) Appl. No.: 13/250,326

(22) Filed: Sep. 30, 2011

(65) Prior Publication Data
US 2013/0086071 A1  Apr. 4, 2013

(51) Int. Cl.
G06F 17/30 (2006.01)
G06F 3/048 (2013.01)

(52) U.S. Cl.
CPC .......... *G06F 17/30672* (2013.01); *G06F 3/048* (2013.01); *G06F 17/30* (2013.01); *Y10S 715/968* (2013.01)
USPC ........... 707/728; 707/731; 707/742; 707/754; 707/758; 707/766; 707/805; 715/751; 715/968

(58) Field of Classification Search
CPC ................................. G06F 17/30; G06F 3/048
USPC ......... 707/708, 728, 731, 742, 754, 758, 766, 707/805; 715/234–237, 751, 762–763, 969
See application file for complete search history.

(56) References Cited

U.S. PATENT DOCUMENTS

| | | | |
|---|---|---|---|
| 5,778,361 A * | 7/1998 | Nanjo et al. | 1/1 |
| 6,400,381 B1 * | 6/2002 | Barrett et al. | 715/758 |
| 6,816,850 B2 | 11/2004 | Culliss | |
| 6,981,040 B1 * | 12/2005 | Konig et al. | 709/224 |
| 7,181,680 B2 * | 2/2007 | Lin et al. | 715/229 |
| 7,548,929 B2 | 6/2009 | Collins et al. | |
| 8,055,669 B1 * | 11/2011 | Singhal et al. | 707/765 |
| 8,606,787 B1 * | 12/2013 | Asgekar et al. | 707/737 |
| 2004/0205044 A1 * | 10/2004 | Su et al. | 707/2 |
| 2005/0256866 A1 * | 11/2005 | Lu et al. | 707/5 |
| 2006/0184977 A1 * | 8/2006 | Mueller et al. | 725/86 |
| 2007/0027864 A1 | 2/2007 | Collins et al. | |
| 2007/0124277 A1 * | 5/2007 | Chen et al. | 707/2 |
| 2007/0198506 A1 * | 8/2007 | Attaran Rezaei et al. | 707/5 |
| 2008/0243779 A1 | 10/2008 | Behnen et al. | |
| 2008/0250332 A1 * | 10/2008 | Farrell et al. | 715/753 |
| 2009/0024468 A1 | 1/2009 | Broder et al. | |

(Continued)

OTHER PUBLICATIONS

"Exploiting Social Relations for Query Expansion and Result Ranking" Matthias Bender, Tom Crecelius, Mouna Kacimi, Sebastian Michel, Thomas Neumann, Josiane Xavier Parreira, Ralf Schenkel, Gerhard Weikum 2008.*

(Continued)

*Primary Examiner* — Srirama Channavajjala
(74) *Attorney, Agent, or Firm* — Klarquist Sparkman, LLP

(57) ABSTRACT

Techniques and tools are described for augmenting search using association information. Searches can be performed using a combination of index information and association information. In some examples, index information is stored in a first data store and association information is stored in a second data store. Search queries can be received and modified using association information. Modified search queries can be executed using a combination of index information and association information. Index information can be generated by indexing a set of documents. Association information can be generated by monitoring user activity occurring between users and a set of documents.

18 Claims, 8 Drawing Sheets

(56) References Cited

U.S. PATENT DOCUMENTS

| | | | |
|---|---|---|---|
| 2009/0024469 A1 | 1/2009 | Broder et al. | |
| 2009/0024623 A1 | 1/2009 | Broder et al. | |
| 2009/0024718 A1 | 1/2009 | Anagnostopoulos et al. | |
| 2009/0094021 A1* | 4/2009 | Marvit et al. | 704/9 |
| 2009/0198684 A1 | 8/2009 | Collins et al. | |
| 2009/0228528 A1* | 9/2009 | Ercegovac et al. | 707/203 |
| 2009/0254512 A1 | 10/2009 | Broder et al. | |
| 2009/0307168 A1* | 12/2009 | Bockius et al. | 706/46 |
| 2009/0307205 A1* | 12/2009 | Churchill et al. | 707/5 |
| 2010/0010959 A1 | 1/2010 | Broder et al. | |
| 2010/0083217 A1* | 4/2010 | Dalal et al. | 717/106 |
| 2010/0198857 A1 | 8/2010 | Metzler et al. | |
| 2010/0274790 A1* | 10/2010 | Hong et al. | 707/748 |
| 2010/0306049 A1 | 12/2010 | Kakade et al. | |
| 2011/0022657 A1* | 1/2011 | Zhu et al. | 709/204 |
| 2011/0040776 A1* | 2/2011 | Najm et al. | 707/766 |
| 2011/0196855 A1* | 8/2011 | Wable et al. | 707/711 |
| 2011/0202541 A1* | 8/2011 | Permandla et al. | 707/742 |
| 2013/0041884 A1* | 2/2013 | Nomula | 707/710 |

OTHER PUBLICATIONS

Hao Yan et al., "Inverted Index Compression and Query Processing with Optimized Document Ordering", WWW 2009 Madrid, Track: Search / Session: Query Processing ACM, Apr. 20-24, 2009, Madrid, Spain. pp. 401-410.*

Anagnostopoulos et al., "Just-in-Time Contextual Advertising," *CIKM '07*, Nov. 6-8, 2007, Lisboa, Portugal, 10 pages.

Broder et al., "Online Expansion of Rare Queries for Sponsored Search," *ACM Conference on the World Wide Web (WWW 2009)*, Apr. 20-24, 2009, Madrid, Spain, 10 pages.

Broder et al., "Search Advertising using Web Relevance Feedback," *Proceedings of the 17th (ACM) Conference on Information and Knowledge Management (CIKM '08)*, Oct. 26-30, 2008, Napa Valley, California, 10 pages.

Gabrilovich et al., "Classifying Search Queries Using the Web as a Source of Knowledge," *ACM Transactions on the Web*, Apr. 2009, 28 pages.

Radlinski et al., "Optimizing Relevance and Revenue in Ad Search: A Query Substitution Approach," *Proceedings of the 31st ACM International Conference on Research and Development in Information Retrieval (SIGIR)*, Jul. 20-24, 2008, Singapore, 8 pages.

Wikipedia, "Inverted Index," <http://en.wikipedia.org/wiki/Inverted_index> 3 pages (accessed Sep. 30, 2011).

Wikipedia, "Vector Space Model," <http://en.wikipedia.org/wiki/Vector_space_model>, 4 pages (accessed Sep. 30, 2011).

* cited by examiner

AUGMENTING SEARCH WITH ASSOCIATION INFORMATION

BACKGROUND

Traditional search systems use vector space models and inverted indices to index documents. In a traditional search system, a collection of documents and their contents are analyzed and inverted indices are generated. The inverted indices are data structures that are optimized for quick retrieval of documents best matching a search query. Documents matching a search query can be returned with associated scores indicating how well the documents match the query.

Before an inverted index can be used for searching a set of documents, the inverted index must be built. Building the inverted index takes far longer than executing a query using the index. Due to the length of time needed to build the index, indexing a set of documents is typically performed periodically, such as once a day, once every few days, or at longer intervals.

Because indexing documents can take a substantial amount of time (especially if the number of documents to index is large), it can be difficult to maintain an index that represents frequently changing activity. For example, if a set of documents is indexed once a day at midnight, then changes to the documents that occur during the day will not be represented in the index until the documents are indexed the following night. When performing a search using such an index, the results will only reflect the state of the documents when they were indexed (i.e., changes to the documents since they were indexed will not be reflected in the results).

Furthermore, traditional search systems that index search terms within documents are only able to capture information represented within the documents themselves (e.g., text and other content of the documents). Traditional search systems do not represent other activity that may be occurring with respect to the documents.

Therefore, there exists ample opportunity for improvement in technologies related to improving document indexing and search technologies.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and tools are described for performing searches using, at least in part, association information. For example, a method is provided for performing a search using association information. The method comprises receiving a search query from a user, generating a modified search query from the search query, executing the modified search query using a first data store and a second data store, and returning results of the execution to the user. The modified search query is generated, at least in part, based upon association information between users and documents. The first data store stores index information for documents using, at least in part, an inverted index, and the second data store stores the association information between users and documents.

As another example, a search system is provided for performing searches using association information. The search system comprises a first data store that stores index information for documents using, at least in part, an inverted index, and a second data store that stores association information between users and the documents. The search system is further configured to receive search queries from the users and execute the search queries using a combination of information from the first data store and the second data store.

As another example, a method is provided for generating data stores used for performing searches using association information. The method comprises indexing a set of documents, storing index information from the indexing of the set of documents in a first data store (e.g., using an inverted index), monitoring activity between users and the set of documents, and storing association information obtained from the monitoring of the activity in a second data store. The association information can be stored in the second data store as dynamic entries in the second data store. Furthermore, the monitoring of the activity and storing the association information can be performed in near-real-time as activity between the users and the documents occur.

Association information can represent activity between users and documents. The activity can be based on one or more social activity features (e.g., likes, views, edits, and viewed by friends).

The foregoing and other objects, features, and advantages of the invention will become more apparent from the following detailed description, which proceeds with reference to the accompanying figures.

DETAILED DESCRIPTION

Figure 1:
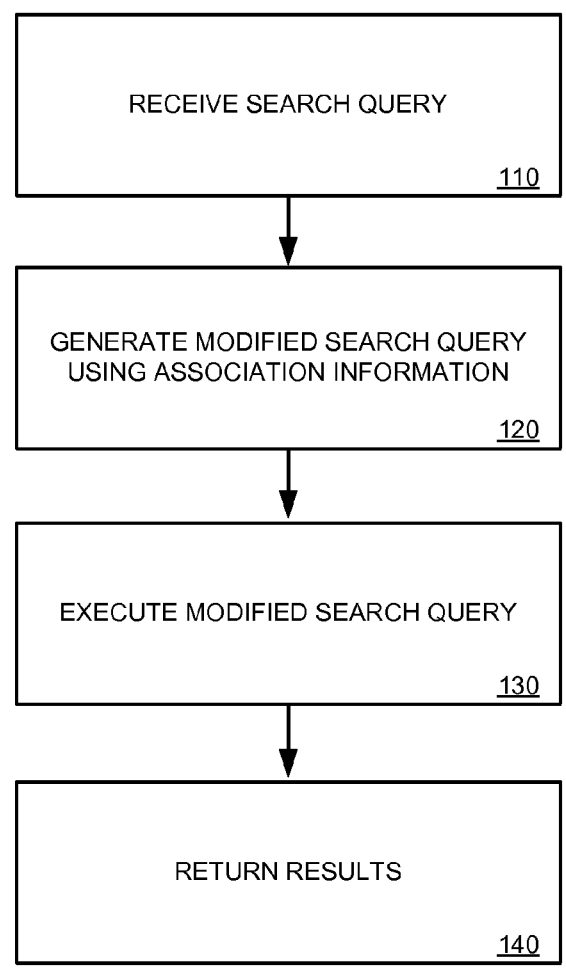
FIG. 1 is a flowchart showing an example method for performing a search using association information.

The following description is directed to techniques and solutions for augmenting search techniques using association information, including building search resources (e.g., data stores) used to support searches using association information.

Traditional search techniques (e.g., indexing documents using inverted indexes) can be augmented using association information. Because document indexing can be time and resource intensive, it is generally performed periodically (e.g., once a day or once a week). While traditional search techniques may be satisfactory for documents that do not change often (e.g., on average less than once a day), they may not be appropriate for tracking frequently-occurring activity between users and documents, or tracking frequent changes within documents. Furthermore, traditional search techniques do not take into account the social context of the documents, which can change rapidly as activity related to the documents occurs.

In some embodiments, two data stores are created to support searching using association information. A first data store is created for storing index information for documents. For example, the index information can comprise information mapping search terms (e.g., text and/or non-text search terms, such as words, phrases, categories, locations, users, etc.) to documents containing those terms. The index information can be stored, at least in part, using an inverted index. The first data store can be created and maintained using traditional search index techniques, and can be updated periodically (e.g., indexing can take place once a day). A second data store is created for storing association information between users and documents. The association information represents activity that is occurring between the users and the documents (e.g., indications that a user likes a document, has viewed a document, or has a friend that has viewed and/or liked a document). Because association information can be more easily tracked and stored (e.g., the documents themselves do not have to be indexed), the association information can be stored in near-real-time as the activity between the users and the documents occur. For example, the latency between the time the activity occurs and the time the association information is stored can be a matter of seconds (e.g., 10 seconds or less).

Using a combination of document index information and association information can improve search efficiency and provide additional search functionality. For example, both index information and association information can be generated and stored for a set of documents. The index information can be generated or updated less frequently (e.g., daily) than the association information (e.g., which can be generated or updated in near-real-time, such as with a 10 second latency). Search efficiency can be improved by obtaining a subset of the set of documents using the association information (e.g., a search query can be augmented with a set of document identifiers). For example, a user can search within a specific category (e.g., social activity feature) of association information (e.g., only within those documents for which the user has indicated a "likes" association). Once the subset of documents has been identified using the association information, a search using the index information can be limited to only the subset of documents (e.g., based on document identifiers). For example, the search can be limited to only index information for the subset of documents (e.g., instead of searching index information for all documents in the index).

Exemplary Activity

In the techniques and solutions described herein, activity refers to activity (e.g., actions) that occurs between users and documents. Activity is sometimes referred to as social activity, relationships, associations, and the like. Examples of activity include a user viewing a document (e.g., a user clicking on a document in a file system or on a web page), a user liking a document (e.g., a user clicking on a user interface element associated with the document indicating the user likes the document), a user editing or modifying a document, and a user commenting on a document (e.g., a user adding a comment associated with the document).

In some embodiments, activity between users and documents occurs within the context of a social networking web site. For example, the social networking web site can support and monitor activity that occurs between users and documents, such as whether a user indicates a like preference for a document, whether a user's friends have liked and/or viewed a document, whether activity has occurred recently (e.g., documents that the user has viewed in the last hour or the last day), and aggregate activity (e.g., a user activity stream that includes which documents the user has liked, viewed, and commented upon recently).

Exemplary Documents

In the techniques and solutions described herein, documents refer to electronic information that a user can interact with. For example, documents can include word processing files, text files, presentations, web pages, instant messages, blog posts, pictures, video or audio clips, or any other type of electronic information.

Users can interact with documents in a variety of ways. For example, users can select documents, view documents, read documents, edit or modify documents, indicate that they like documents, comment on documents, send documents to friends, and so on.

Documents can be indexed. For example, index information can be generated for a document. The index information can indicate terms (e.g., text or non-text terms) that are present in the document, and can further indicate where the terms appear in the document. Index information can be stored using, at least in part, an inverted index.

Documents can be associated with document identifiers (document IDs). Each document can be associated with a unique document ID. Different data stores can use the same document IDs to refer to the same documents, or different data stores can use different internal document ID representations (or multiple different internal document ID representations, such as with multiple segments of inverted indexes) that can be mapped (translated) to the same external document ID representation. In a situation where different internal representations are used, a data store can use internal document IDs for documents associated with that data store, and different data stores can use different internal IDs. Different data stores may use different internal IDs to refer to the same documents. However, internal IDs can be mapped to external IDs, which can be the same for the same document across the different data stores. Because different data stores can identify the same documents using the same document ID (either using the same internal representation or by mapping to the same external representation), different data stores can operate within the same vector space for document identifiers. Furthermore, using the same internal IDs, or the same mapped external IDs, the same document can be identified regardless of which data store it is referenced in.

In a specific embodiment, mapping from internal document IDs to external document IDs is performed using one or more lookup tables. In another embodiment, external document IDs are stored alongside internal document IDs in the data stores. For example, each occurrence of an internal document ID (e.g., in an inverted index) can also list its corresponding external ID. Storing both internal ID and external ID in the data store (e.g., document index data store and association information data store) may increase the size of the data store, but also allows efficient identification of documents.

Exemplary Association Information

In the technologies described herein, association information refers to information describing associations, or relationships, between users and documents. Association information also refers to social information or social context between users and documents. Association information refers to the associations, or relationships, between users and documents, and does not include index information from the content of the document itself (e.g., association information does not include index information for terms within a document).

Association information can be obtained by monitoring and storing activities (which can be referred to, and categorized, as social activity features) that occur between users and documents. For example, activity (such as "likes" and/or "views") can be recorded for each user in a data store. For example, association information can be obtained by monitoring activity that occurs between users and documents within a social networking web for one or more social activity features, such as whether a user indicates a like preference for a document, whether a user's friends have liked and/or viewed a document, whether activity has occurred recently (e.g., documents that the user has viewed in the last hour or the last day), and aggregate activity (e.g., a user activity stream that includes which documents the user has liked, viewed, and commented upon recently).

Association information can include an indication of whether a user "likes" a document. For example, a user can indicate that the user "likes" a particular document (e.g., by clicking on a user interface element associated with the particular document to indicate that the user wants to establish the "likes" association between the user and the particular document). A user may indicate that the user "likes" the particular document for a variety of reasons. For example, the user may believe the document is interesting or well-written. Or, the user may believe that the document is relevant to a job or task the user is working on. Or, the user may believe the document is of personal interest. The reason that the user "likes" the particular document may or may not be relevant to the operation of the technology described herein. What is relevant is that the user establishes an association with the particular document.

As another example, association information can include an indication of whether a user has "viewed" a document. Viewing a document can indicate that a user has displayed, accessed, or in some way selected the document (e.g., accessed or displayed the document on the display of a computing device, such as a computer or smart phone). For example, a user may click on a text document and read the contents. The user may also click on a picture to view the picture, select an audio and listen to the audio, or select and view a movie.

As another example, association information can include an indication of whether a user's friends have "viewed" or "liked" a document, or that the user's friends have established some other type of relationship with a document (e.g., edited, commented upon, etc.). For example, a user may be associated with one or more friends. The user's one or more friends view and/or like various documents. The association information can include an indication that one or more of the user's friends have "viewed" and/or "liked" particular documents. The association information can also be extended further, such as to friends of friends.

As another example, association information can include an indication of whether a user has commented on a document. For example, a user may view a document and wish to leave a comment (e.g., the document may be a new business proposal and the user wishes to make a suggestion for a change to the document). The association information can include an indication that the user has commented upon the document.

As another example, association information can include an indication of whether a user has edited (modified) a document. For example, a user may edit a document by editing text or other content within the document, or has modified the document in some other way (e.g., modified a property of the document).

Association information can also include modifiers, such as a timeframe. For example, association information can include an indication of which documents a user has "viewed" recently (e.g., within the last 15 minutes, the last hour, or the last day).

Association information can represent a combination of different types of activity. For example, a combination of like and view activity can be stored as one social activity feature. In a specific embodiment, an activity stream social activity feature is used, which monitors and stores like, view, and viewed by friends activity.

Association information can be used when scoring results. For example, documents that appear in specific social activity features in the association information (e.g., viewed in the past hour) can be scored higher than other documents in the results, or documents that appear in multiple social activity features in the association information can be scored higher than those that appear in fewer features.

Exemplary Searching using Association Information

In the techniques and solutions described herein, a search can be performed using, at least in part, association information (e.g., separately or in combination with index information). The association information can be used to modify, or filter, documents that are searched using the index information. In some implementations, index information and association information are stored in separate data stores (e.g., separate databases, files, data repositories, or the like). For example, index information is stored in a first data store and association information is stored in a second data store. In other implementations, index information and association information are stored in the same data store (e.g., as separate types of information in a database or other type of data storage repository).

Using traditional search techniques, searches are performed by finding search terms in documents using index information. For example, an inverted index is a common index technique used to store index information regarding terms in documents. However, using index information (e.g., information that maps terms to documents that contain those terms) does not take into account associations (e.g., social context) that users may have with particular documents.

Association information can be used to modify, or augment, search queries (e.g., to filter documents that are searched). For example, a traditional document search index may contain index information for thousands or millions of different documents. Due to the number of documents, indexing the documents may be performed only periodically (e.g., once a day). Furthermore, index information only considers terms contained within the documents. In order to expand search functionality and account for associations between users and documents, association information can be obtained (e.g., by monitoring activity between users and documents) and stored. The association information can be monitored and stored on a near-real-time basis (e.g., with a latency of about 10 seconds). Using a combination of index information and association information, a user can enter a search query and an indication of association (e.g., an automatically-determined or user-defined social activity feature) to limit or filter searching to only those documents that match the association. For example, instead of searching index information for the thousands or millions of documents in the index, only the index information for a subset of the documents that match the association can be searched. Alternatively, a search on the full set of index information can be performed and the results filtered based on the association information.

FIG. 1 is a flowchart showing an exemplary method 100 for performing a search using association information. At 110, a search query is received. For example, the search query can be received from a user (e.g., via an entry on a search query web page). The search query can comprise text search terms. The search query can also comprise non-text search terms.

At 120, a modified search query is generated from the search query 110. The modified search query is generated, at least in part, using association information. The association information represents association activity between users and documents. The association information can include information that is automatically determined (e.g., one or more social activity features that are automatically determined for the user submitting the query), information that is selected by the user submitting the query (e.g., one or more social activity features that are selected by the user), or a combination of automatically determined and user selected information.

At 130, the modified search query is executed using a first data store and a second data store. The first data store stores, at least in part, document index information (e.g., using an inverted index). The second data store stores the association information between users and documents.

At 140, results of the execution of the modified search query 130 are returned to the user. For example, the results can be displayed on a search results web page. Results can include a list of documents that match the modified search query (e.g., listed by document name, document content, document identifier, etc.). Results can also include scores, such as a relevance score for each document in the results indicating how well each document matches the modified query (e.g., matches the search query terms, the association information, or a combination).

For example, the user may enter a search query 110 of "great vacation". The search query can be represented as a search for keywords in a specific format. The following example search query format indicates a search for documents that contain the term "great" or the term "vacation".

Query: (body:great OR body:vacation)

A modified search query can be generated 120 using association information. For example, the following modified search query indicates a search for documents that contain the term "great" or the term "vacation" in the content of a document, as well as a requirement that the documents to be searched are listed in the user's activity stream.

Modified query: (body:great OR body:vacation) AND user:activityStream

Figure 2:
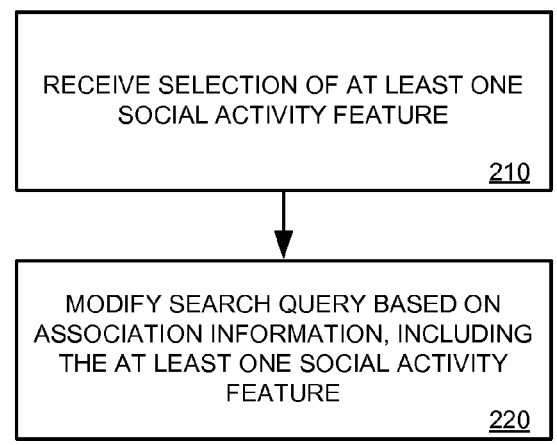
FIG. 2 is a flowchart showing an example method for modifying a search query using a social activity feature.

FIG. 2 is a flowchart showing an exemplary method 200 for modifying a search query using a social activity feature. At 210, a selection of at least one social activity feature is received from a user. For example, the selection can be received via a search web page that lists a number of social activity features for user selection (e.g., via user interface elements such as check boxes, drop-down lists, etc.).

At 220, a search query is modified based on association information, including the selected one or more social activity features 210. For example, a user interface can be presented to a user entering a search query from which the user can select one or more social activity features (e.g., likes, views, viewed by friends, etc.). A selection of one or more of the social activity features presented to the user can be received and used to modify a search query entered by the user (e.g., to limit a search to those documents indicated by the selected social activity features).

Exemplary Systems for Searching using Association Information

In the techniques and solutions described herein, a search system for performing searches using association information can be provided. The search system can comprise a first data store that stores index information for documents. The index information can be stored using an inverted index. The search system can also comprise a second data store that stores association information between users and documents. Alternatively, a single data store can be used to store the index information and the association information.

The search system is configured to support search requests from users. For example, the search system supports receiving search queries from users and executing the search queries using information from the first data store and the second data store. In some embodiments, the search system receives a search query from a user and generates a modified search query using association information from the second data store. The search system executes the modified search query using index information from the first data store and returns results to the user.

Figure 3:
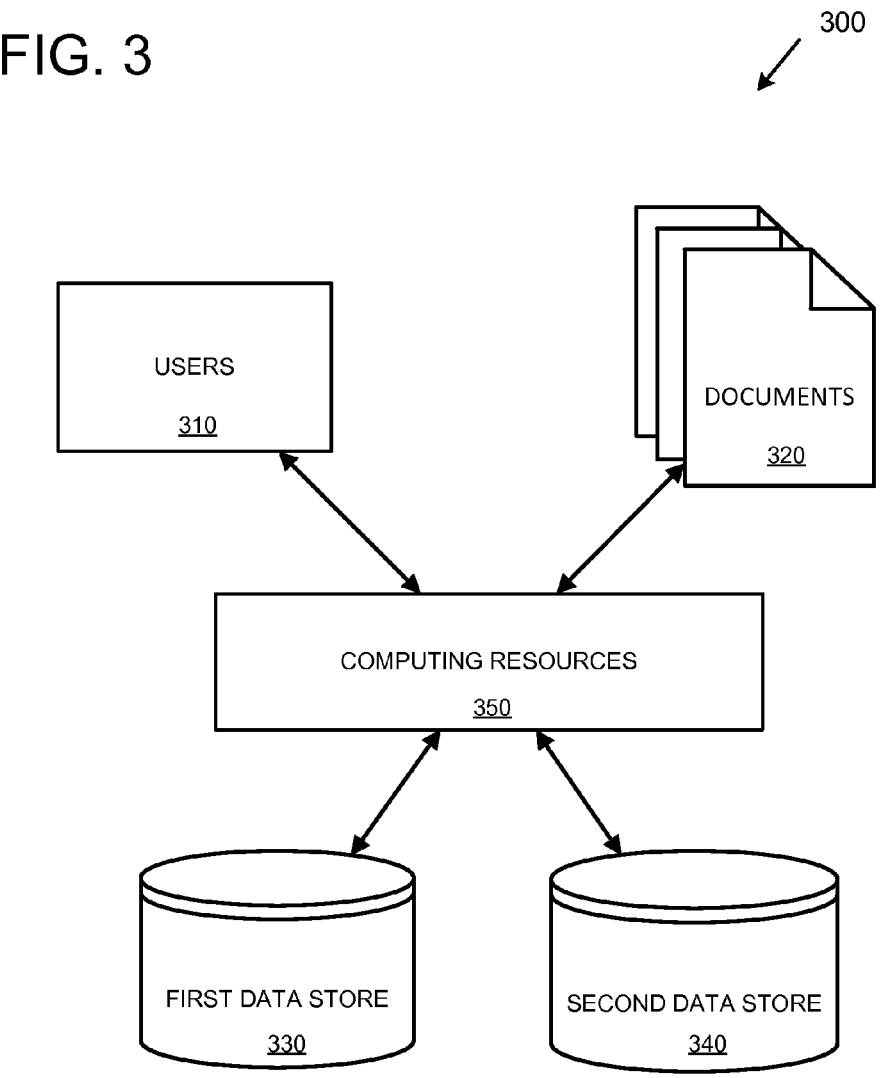
FIG. 3 is a block diagram depicting an example environment for searching using association information.

FIG. 3 is a diagram depicting an exemplary environment 300 for searching using association information. The environment 300 includes a number of users 310 and documents 320. The users 310 access the documents 320 via computing resources 350. The computing resources 350 can comprise computers (e.g., desktop or laptop computers, smart phones, tablet computers, etc., used by the users 310), servers (e.g., database and web servers), networking equipment, and other computing resources.

The environment 300 also includes a first data store 330 and a second data store 340. The first data store 330 stores index information for the documents 320. For example, the computing resources 350 can comprise an index server that indexes terms in the documents 320 and stores those terms in the first data store 330 (e.g., indexes the documents 320 periodically, such as once a day). The index information can be stored in the first data store 330 using, at least in part, an inverted index.

The second data store 340 stores association information between the users 310 and the documents 320. For example, the users 310 perform various activities associated with the documents 320 (e.g., viewing, liking, commenting, etc.). The various activities are monitored by computing resources 350 (e.g., by one or more computer servers, such as web or file servers, of the computing resources 350). The association information is then stored in the second data store 340. For example, the second data store can store association information for one or more social activity features (e.g., a like feature, a viewed feature, a friends viewed feature, etc.).

In some embodiments, the second data store 340 can store additional information about documents (e.g., additional information that is not related to the content of the documents). For example, the second data store 340 can store a deleted feature which indicates documents (e.g., a list of document identifiers) that have been deleted from the system (e.g., that have been deleted from the system since the last time the documents have been indexed and stored in the first data store 330). The deleted feature can be used to augment search queries by excluding the deleted documents from the search and/or results.

In some embodiments, the second data store 340 can store dynamic information (e.g., association information and/or recent index information from the documents 320) that has occurred since index information was generated and stored in the first data store 330. Using the second data store to store dynamic information (e.g., very recently updated information) can provide for efficient searching of up-to-date information (e.g., using a combination of the information in the first data store 330 and second data store 340) without having to rebuild the index information in the first data store 330.

The environment 300 supports searching using a combination of information from the first data store 330 and the second data store 340. For example, search queries can be received from the users 310 (e.g., via servers, such as web and/or database servers of the computing resources 350). The search queries can be modified and executed by the computing resources 350. For example, the search queries can be modified using association information from the second data store 340 to limit or filter which documents are searched from the first data store 330.

Exemplary Generating Index Information and Association Information

In the techniques and solutions described herein, index information can be generated by indexing a set of documents. Association information can be generated by monitoring activity that occurs between users and the set of documents. The index information and the association information can be stored in separate data stores, or within the same data store.

Figure 4:
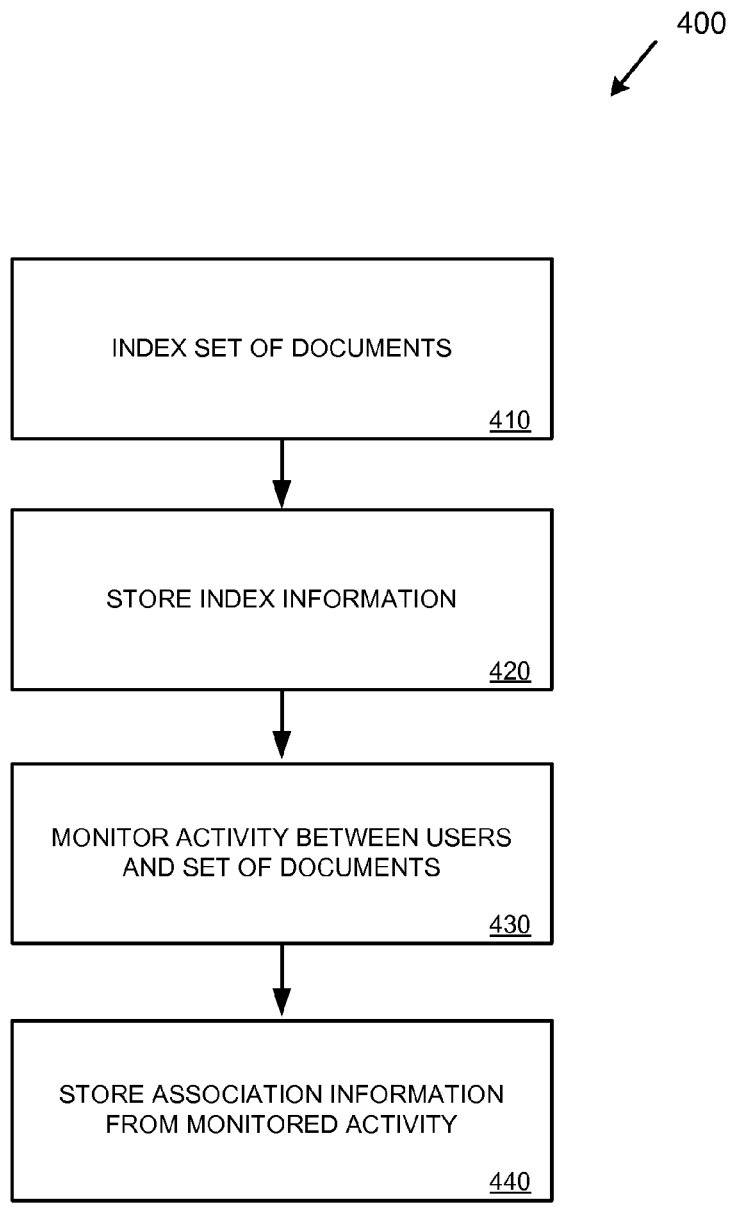
FIG. 4 is a flowchart showing an example method for generating data stores used for performing searches using association information.

FIG. 4 is a flowchart showing an example method 400 for generating data stores used for performing searches using association information. At 410, a set of documents is indexed. At 420, index information from the indexing of the set of documents 410 is stored in a first data store. The index information can be stored 420 using, at least in part, an inverted index.

At 430, activity between users and the set of documents is monitored. For example, the activity can be monitored 430 based on one or more social activity features, such as a likes features, a viewed feature, and a friends viewed feature.

At 440, association information obtained from the monitoring of the activity 430 is stored in a second data store. For example, the association information can be stored as dynamic entries in the second data store.

In some implementations, monitoring the activity between the users and the documents 430 and storing the association information 440 occurs in near-real-time as the activity between the users and the documents occur. For example, the association information can be stored within a very short time of the activity occurring (e.g., within about 10 seconds).

Exemplary Index Information and Association Information

In the techniques and solutions described herein, index information and association information can be generated and stored for use in performing searches. The index information and the association information can be stored in separate data stores or it can be stored in the same data store. The same set of documents can be referenced by the index information and the association information. Determining the identity of a document can be accomplished using a document ID (e.g., either the same internal IDs can be used in both the index information and the association information, or internal IDs can be mapped to external IDs which are the same across both the index information and the association information).

Figure 5:
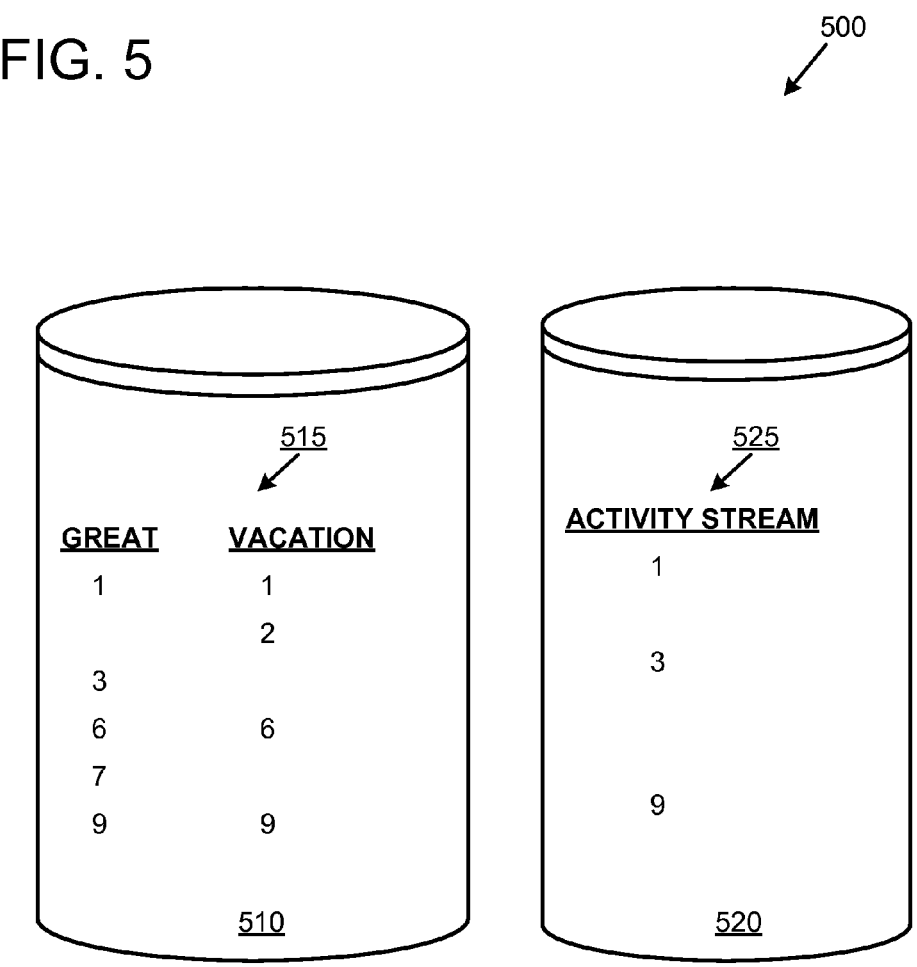
FIG. 5 is a diagram depicting example data stores containing index information and association information.

FIG. 5 is a diagram depicting example data stores 500 containing index information and association information. In the diagram, the first data store 510 contains example index information 515 for nine documents (document IDs 1 through 9). In the example index information 515, two terms are listed, along with the documents in which they appear. Specifically, the term "great" appears in documents with document IDs of 1, 3, 6, 7, and 9. The term "vacation" appears in documents with document IDs of 1, 2, 6, and 9.

In the diagram, the second data store 520 contains example association information 525 for an activity stream social activity feature for a specific user. The association information 525 indicates documents that are associated with the specific user based on the activity monitored by the activity stream feature (e.g., likes, views, etc.). In the example association information 525, documents that have document IDs of 1, 3, and 9 are listed for the activity stream (e.g., the specific user has liked and/or viewed documents associated with document IDs 1, 3, and 9).

In the example data stores 500, both the first data store 510 and the second data store 520 use the same internal document IDs. For example, document ID 1 in the index information 515 of the first data store 510 refers to the same document as document ID1 in the association information 525 of the second data store 520.

Search queries can be executed using the example index information 515 and the example association information 525. For example the following search query can be entered by a user.

Query: (body:great AND body:vacation)

A modified search query can be generated to augment the search query with association information, as follows.

Modified query: (body:great AND body:vacation) AND user:activityStream

Using the example index information 515 and the example association information 525, the above query would return the documents that contain the terms "great" and "vacation" from the index information 515 that are also present in the user's activity stream based on the association information 525. In this example, the above query would thus return document IDs 1 and 9. The returned documents can be listed, for example, by document ID, document name, an excerpt from the document's content, a relevance score, etc.

As another example, the following query can be generated, which will search for documents that contain the term "great" or the term "vacation" that are also in the user's activity stream.

Modified query: (body:great OR body:vacation) AND user:activityStream

Using the example index information 515 and the example association information 525, the above query would return the documents that contain terms "great" or "vacation" from the index information 515 that are also present in the user's activity stream based on the association information 525. In this example, the above query would thus return document IDs 1, 3, and 9.

Figure 6:
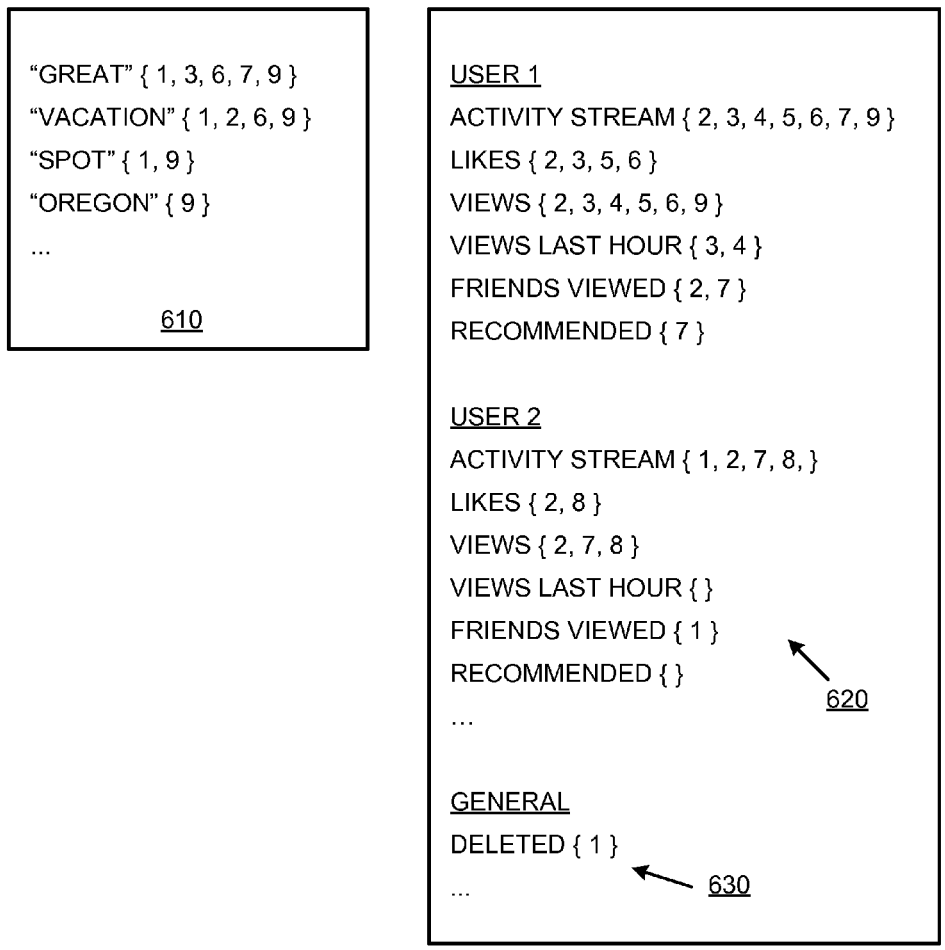
FIG. 6 is a diagram depicting example index information and association information.

FIG. 6 is a diagram depicting example index information 610, association information 620, and general information 630 for a set of nine documents (document IDs 1 through 9). In some embodiments, the index information 610 is stored in a first data store (e.g., updated periodically, such as once a day) and the association information 620 and general information 630 is stored in a second data store (e.g., updated in near-real-time, such as with a latency of about 10 seconds). The same document ID refers to the same document across the example index information 610, association information 620, and general information 630.

In the example index information 610, four terms are listed in a simplified inverted index format along with the documents (listed by document ID) that contain each term. For example, the term "great" is present in documents with document IDs 1, 3, 6, 7, and 9.

In the diagram, example association information 620 is listed for a number of users, including User 1 and User 2. For each user, a number of social activity features are listed along with associated documents. As depicted in the example association information 620, User 1 likes documents with document IDs 2, 3, 5, and 6, User 1 has viewed documents with document IDs 3 and 4 in the last hour, and so on. The example association information 620 also depicts User 1's activity stream, which in this example aggregates the user's likes, views, and friends viewed features (for User 1, the activity stream includes documents with document IDs of 2, 3, 4, 5, 6, 7, and 9). The example association information 620 also depicts a recommended feature for User 1, which indicates documents that the system has automatically recommended (e.g., based on various criteria, such as which documents are popular among the user's friends).

In the diagram, example general information 630 is listed. The general information reflects general activity (e.g., activity that is not related to a specific user) related to the documents that has occurred since the index information 610 was last updated. In the example general information 630, the document associated with document ID 1 has been deleted since the index information 610 was last updated. Using the general information 630 a search query that would otherwise return a result listing the document associated with document ID 1 can be filtered such that the document associated with document ID 1 does not appear in the results.

Queries can be executed using a combination of the example index information 610, the example association information 620, and/or the example general information 630. For example, a query for the terms "great" and "vacation" using user 1's activity steam would result in document IDs 6 and 9. A query for the same terms (great and vacation) based on user 1's likes would result in document ID 6. A query for the same terms (great and vacation) using user 2's activity stream would result in document ID 1 if using only the index information 610 and association information 620, but would result in no documents if the general information 630 is included (because the general information 630 indicates that document 1 has been deleted).

Exemplary User Interface for Searching using Association Information

In the techniques and solutions described herein, user interfaces can be provided for searching using, at least in part, association information. For example, user interfaces can be provided for searching using search queries comprising one or more search terms. The user interfaces can also provide user interface elements for selecting one or more social activity features to augment the search.

Figure 7:
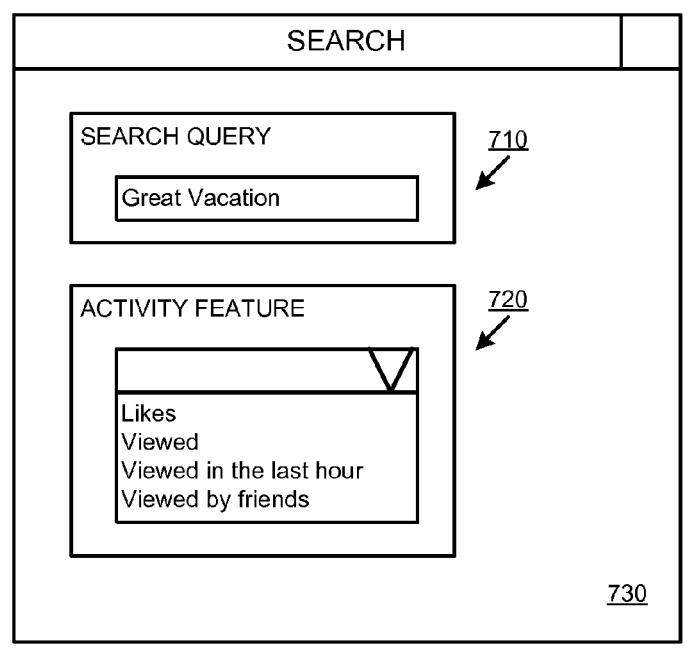
FIG. 7 is a diagram depicting an example user interface for searching using association information.

FIG. 7 is a diagram depicting an example user interface 730 for searching using association information. The user interface 730 includes a search query entry box 710 into which a user can enter a search query. In the user interface 730, a user has entered the query "Great Vacation" into the search query box 710.

The user interface 730 also includes an area for the user to select a social activity feature 720. As depicted in the user interface 730, the user has the option to select a likes feature, a viewed feature, a viewed in the last hour feature, and a viewed by friends feature. Other or different social activity features can be listed for selection as the social activity feature 720. In different embodiments, the activity feature 720 selection may not be present. For example, the search system can automatically determine a social activity feature to apply to the search query (e.g., based on a user-defined preference or based on a default preference). In some embodiments, the search system automatically uses the activity stream of the user entering the search query as the activity feature.

Once the user has entered the search query 710, the query can be modified using the activity feature 720, and the search can be performed using index information and association information (based on the selected activity feature 720).

Exemplary Computing Devices

The techniques and solutions described herein can be performed by software and/or hardware of a computing environment, such as a computing device. For example, computing devices include server computers, desktop computers, laptop computers, notebook computers, netbooks, tablet devices, mobile devices, and other types of computing devices. The techniques and solutions described herein can be performed in a cloud computing environment (e.g., comprising virtual machines and underlying infrastructure resources).

Figure 8:
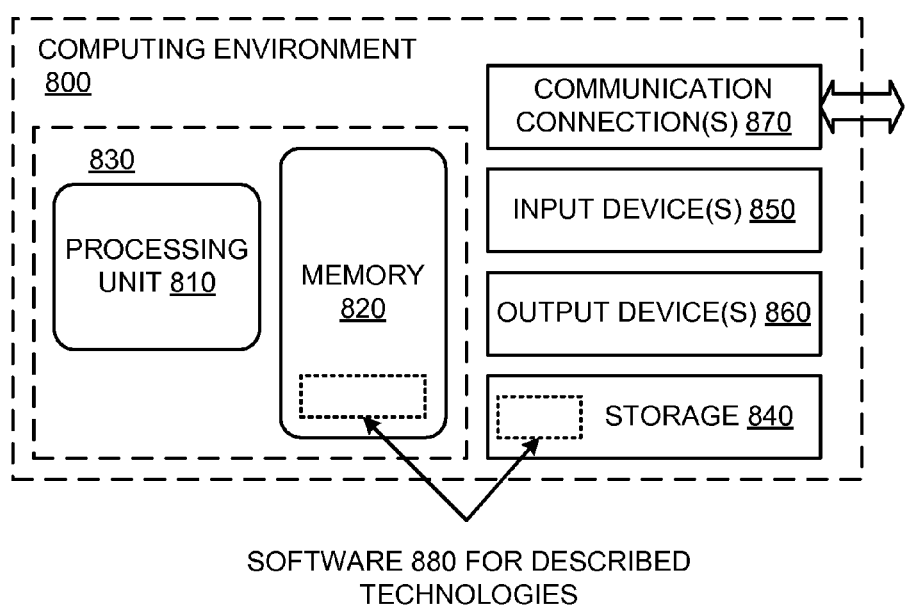
FIG. 8 is a block diagram illustrating an example mobile computing device in conjunction with which techniques and tools described herein may be implemented.

FIG. 8 illustrates a generalized example of a suitable computing environment 800 in which described embodiments, techniques, and technologies may be implemented. The computing environment 800 is not intended to suggest any limitation as to scope of use or functionality of the technology, as the technology may be implemented in diverse general-purpose or special-purpose computing environments. For example, the disclosed technology may be implemented using a computing device (e.g., a server, desktop, laptop, hand-held device, mobile device, PDA, etc.) comprising a processing unit, memory, and storage storing computer-executable instructions implementing the technologies described herein. The disclosed technology may also be implemented with other computer system configurations, including hand held devices, multiprocessor systems, microprocessor-based or programmable consumer electronics, network PCs, minicomputers, mainframe computers, a collection of client/server systems, and the like. The disclosed technology may also be practiced in distributed computing environments where tasks are performed by remote processing devices that are linked through a communications network. In a distributed computing environment, program modules may be located in both local and remote memory storage devices.

With reference to FIG. 8, the computing environment 800 includes at least one central processing unit 810 and memory 820. In FIG. 8, this most basic configuration 830 is included within a dashed line. The central processing unit 810 executes computer-executable instructions. In a multi-processing system, multiple processing units execute computer-executable instructions to increase processing power and as such, multiple processors can be running simultaneously. The memory 820 may be volatile memory (e.g., registers, cache, RAM), non-volatile memory (e.g., ROM, EEPROM, flash memory, etc.), or some combination of the two. The memory 820 stores software 880 that can, for example, implement the technologies described herein. A computing environment may have additional features. For example, the computing environment 800 includes storage 840, one or more input devices 850, one or more output devices 860, and one or more communication connections 870. An interconnection mechanism (not shown) such as a bus, a controller, or a network, interconnects the components of the computing environment 800. Typically, operating system software (not shown) provides an operating environment for other software executing in the computing environment 800, and coordinates activities of the components of the computing environment 800.

The storage 840 may be removable or non-removable, and includes magnetic disks, magnetic tapes or cassettes, CD-ROMs, CD-RWs, DVDs, or any other tangible storage medium which can be used to store information and which can be accessed within the computing environment 800. The storage 840 stores instructions for the software 880, which can implement technologies described herein.

The input device(s) 850 may be a touch input device, such as a keyboard, keypad, mouse, pen, or trackball, a voice input device, a scanning device, or another device, that provides input to the computing environment 800. For audio, the input device(s) 850 may be a sound card or similar device that accepts audio input in analog or digital form, or a CD-ROM reader that provides audio samples to the computing environment 800. The output device(s) 860 may be a display, printer, speaker, CD-writer, or another device that provides output from the computing environment 800.

The communication connection(s) 870 enable communication over a communication medium (e.g., a connecting network) to another computing entity. The communication medium conveys information such as computer-executable instructions, compressed graphics information, or other data in a modulated data signal.

Alternatives and Variations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media (e.g., non-transitory computer-readable media, such as one or more optical media discs such as DVD or CD, volatile memory components (such as DRAM or SRAM), or nonvolatile memory components (such as flash memory or hard drives)) and executed on a computer (e.g., any commercially available computer, including smart phones or other mobile devices that include computing hardware). By way of example and with reference to FIG. 8, computer-readable storage media include memory 820 and/or storage 840. As should be readily understood, the term computer-readable storage media does not include communication connections (e.g., 870) such as modulated data signals.

Any of the computer-executable instructions for implementing the disclosed techniques as well as any data created and used during implementation of the disclosed embodiments can be stored on one or more computer-readable storage media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

The disclosed methods, apparatus, and systems should not be construed as limiting in any way. Instead, the present disclosure is directed toward all novel and non-obvious features and aspects of the various disclosed embodiments, alone and in various combinations and sub-combinations with one another. The disclosed methods, devices, and systems are not limited to any specific aspect or feature or combination thereof, nor do the disclosed embodiments require that any one or more specific advantages be present or problems be solved. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A method, implemented at least in part by a computing device, for performing a search using association information, the method comprising:
　receiving a search query from a user;
　generating a modified search query from the search query, wherein the modified search query is generated, at least in part, based upon association information between users and documents;
　executing, by the computing device, the modified search query, wherein the executing the modified search query comprises:
　　identifying, based on association information, a set of documents listed in a second data store, wherein the second data store stores the association information which comprises relationships between the users and the documents for one or more social activity features;
　　receiving, from the user, a selection of at least one social activity feature, wherein the modified search query uses the association information for the at least one social activity feature; and
　　searching, using the search query, within the set of documents using a first data store, wherein the first data store comprises index information for the set of documents using, at least in part, an inverted index; and
　returning, to the user, results of the execution of the modified search query;
　wherein the identified set of documents listed in the second data store is a subset of all documents indexed within the first data store;
　wherein the modified search query searches within the subset of all documents indexed within the first data store; and
　wherein the subset of all documents indexed within the first data store is determined based on the association information from the second data store.

2. The method of claim 1, wherein the search query comprises one or more search terms entered by the user.

3. The method of claim 1, wherein the one or more social activity features comprise one or more of:
- a "like" feature that indicates which documents users have liked;
- a "viewed" feature that indicates which documents users have viewed; and
- a "friends viewed" feature that indicates which documents users' friends have viewed.

4. The method of claim 1, wherein the second data store stores the association information as dynamic entries in the second data store, and wherein the association information is stored in near-real-time as associations between the users and the documents occur.

5. The method of claim 1, wherein the first data store and the second data store operate within the same vector space.

6. A search system for performing searches using association information, the search system comprising:
- a first data store that stores index information for documents using, at least in part, an inverted index; and
- a second data store that stores association information between users and the documents, wherein the association information comprises relationships between the users and the documents for one or more social activity features;

wherein the search system is configured to:
- receive search queries from the users;
- generate modified search queries from the search queries, wherein the modified search queries are generated, at least in part, based upon the association information between the users and the documents; and
- execute the modified search queries using a combination of information from the first data store and the second data store by, for each modified search query:
  - identifying, based on the association information, a set of documents listed in the second data store;
  - receiving, from a user, a selection of at least one social activity feature, wherein the modified search query uses the association information for the at least one social activity feature;
  - searching, using the search query, within the set of documents using the first data store; and
  - returning, to the user, results of the execution of the modified search query;
- wherein the identified set of documents listed in the second data store is a subset of all documents indexed within the first data store;
- wherein the search query searches within the subset of all documents indexed within the first data store; and
- wherein the subset of all documents indexed within the first data store is determined based on the association information from the second data store.

7. The search system of claim 6, wherein second data store stores the association information as dynamic entries in the second data store, and wherein the association information is stored in near-real-time as associations between the users and the documents occur.

8. The search system of claim 6, wherein the one or more social activity features comprise one or more of:
- a "like" feature that indicates which documents users have liked;
- a "viewed" feature that indicates which documents users have viewed; and
- a "friends viewed" feature that indicates which documents users' friends have viewed.

9. The search system of claim 6, wherein the association information stored by the second data store comprises:
- for each user and for each social activity feature:
  - a list of documents, identified by document identifier, that have been associated with the user for the social activity feature.

10. The search system of claim 6, wherein the first data store stores mappings between terms and documents that contain those terms, and wherein the first data store is updated periodically.

11. The search system of claim 6, wherein the first data store and the second data store operate within the same vector space.

12. A computer-readable medium storing computer-executable instructions for causing a computing device to perform a method for performing a search using association information, the method comprising:
- receiving a search query from a user, wherein the search query comprises one or more search terms;
- generating a modified search query from the search query, wherein the modified search query is generated, at least in part, based upon association information between users and documents;
- executing the modified search query, wherein the executing the modified search query comprises:
  - identifying, based on association information, a set of documents listed in a second data store, wherein the second data store stores the association information which comprises relationships between the users and the documents for one or more social activity features, wherein the second data store stores the association information as dynamic entries in the second data store, and wherein the association information is stored in near-real-time as associations between the users and the documents occur;
  - receiving, from the user, a selection of at least one social activity feature, wherein the modified search query uses the association information for the at least one social activity feature; and
  - searching, using the search query, within the set of documents using a first data store, wherein the first data store comprises index information for the set of documents using, at least in part, an inverted index; and
- returning, to the user, results of the execution of the modified search query;
- wherein the identified set of documents listed in the second data store is a subset of all documents indexed within the first data store;
- wherein the modified search query searches within the subset of all documents indexed within the first data store; and
- wherein the subset of all documents indexed within the first data store is determined based on the association information from the second data store.

13. The computer-readable medium of claim 12, wherein the one or more social activity features comprise one or more of:
- a "like" feature that indicates which documents users have liked;
- a "viewed" feature that indicates which documents users have viewed; and
- a "friends viewed" feature that indicates which documents users' friends have viewed.

14. A method, implemented at least in part by a computing device, for generating data stores used for performing searches using association information, the method comprising:

indexing, at least in part by the computing device, a set of documents;

storing, in a first data store, index information from the indexing of the set of documents, wherein the index information is stored in the first data store using, at least in part, an inverted index;

monitoring, at least in part by the computing device, activity between users and the set of documents; and storing, in a second data store, association information obtained from the monitoring of the activity, wherein the second data store stores the association information as dynamic entries in the second data store, wherein the association information does not consider content contained within the set of documents, wherein the monitoring of the activity and the storing the association information are performed in near-real-time as the activity between the users and the set of documents occur, and wherein the first data store and the second data store provide information for responding to expanded search queries, wherein:

the expanded search queries search a subset of the set of documents based on the index information; and the subset of the set of documents is determined based on the association information from the second data store.

15. The method of claim 14, wherein the indexing the set of documents and the storing the index information occurs periodically, and wherein the monitoring of the activity and the storing the association information are performed more frequently than the indexing the set of documents and the storing the index information.

16. The method of claim 14, wherein the indexing the set of documents and the storing the index information occurs periodically, the method further comprising:

storing, in the second data store, dynamic information regarding the set of documents that has occurred since the storing the index information in the first data store.

17. The method of claim 14, wherein the first data store and the second data store operate within the same vector space, and wherein the first data store and the second data store perform internal to external document identifier (ID) translation.

18. The method of claim 14, wherein the first data store and the second data store provide information for responding to the expanded search queries using a combination of information from the first data store and the second data store.

* * * * *